US008094946B2

(12) United States Patent (10) Patent No.: US 8,094,946 B2
Maeda et al. (45) Date of Patent: Jan. 10, 2012

(54) IMAGE PROCESSING SYSTEM AND IMAGE TAMPERING ASSESSMENT METHOD AND CONTROL PROGRAM OF THE SAME

(75) Inventors: Etsuko Maeda, Ohta-ku (JP); Yoichi Takaragi, Yokohama (JP); Hiroyuki Kimura, Kawasaki (JP)

(73) Assignee: Canon Kabushiki Kaisha (JP)

( * ) Notice: Subject to any disclaimer, the term of this patent is extended or adjusted under 35 U.S.C. 154(b) by 997 days.

(21) Appl. No.: 11/198,953

(22) Filed: Aug. 8, 2005

(65) Prior Publication Data

US 2006/0029251 A1 Feb. 9, 2006

(30) Foreign Application Priority Data

Aug. 6, 2004 (JP) ................................. 2004-231247

(51) Int. Cl.
*G06K 9/00* (2006.01)
(52) U.S. Cl. ........ 382/209; 382/218; 382/219; 382/224; 235/379; 705/45
(58) Field of Classification Search .................. 382/209, 382/218, 219, 224; 235/379; 705/45
See application file for complete search history.

(56) References Cited

U.S. PATENT DOCUMENTS

| | | | | | |
|---|---|---|---|---|---|
| 5,190,318 | A | * | 3/1993 | Mantegazza | 235/379 |
| 5,504,822 | A | * | 4/1996 | Holt | 382/218 |
| 5,605,738 | A | * | 2/1997 | McGinness et al. | 283/92 |
| 5,668,897 | A | * | 9/1997 | Stolfo | 382/283 |
| 6,474,548 | B1 | * | 11/2002 | Montross et al. | 235/379 |
| 2003/0044043 | A1 | * | 3/2003 | Kaneda | 382/100 |
| 2004/0237047 | A1 | * | 11/2004 | Houle et al. | 715/541 |

FOREIGN PATENT DOCUMENTS

| | | |
|---|---|---|
| JP | 2000-339407 A | 12/2000 |
| JP | 2001-155168 A | 6/2001 |
| JP | 2002-032704 A | 1/2002 |
| JP | 2002-344736 A | 11/2002 |
| JP | 2004-013287 A | 1/2004 |
| JP | 2004-054594 A | 2/2004 |

OTHER PUBLICATIONS

Partial English translation of JP 2000-339407A.
Chinese Office Action for corresponding Chinese Patent Application No. 2005100894185, issued on Dec. 1, 2006, with English translation of relevant portion thereof.
Notification of Rejection issued in corresponding Japanese Patent Application No. 2004-231247 dated Jan. 18, 2011. Full English translation provided.

* cited by examiner

*Primary Examiner* — Wesley Tucker
(74) *Attorney, Agent, or Firm* — Rossi, Kimms & McDowell LLP

(57) ABSTRACT

The present invention provides an image processing system, which can reduce calculation time by alleviating a calculation load in assessing the occurrence of tampering of an image.

For example, the image processing system of the present invention first identifies a type of a form of an image to be assessed in assessing the occurrence of tampering. Next, a characteristic amount of a certain region (flexible region) corresponding to the identified type of a form is extracted as a characteristic amount of the image to be assessed. Then, the extracted characteristic amount of image to be assessed and the characteristic amount extracted from a certain region in an original image are compared and the compared result is notified as the assessment result.

A flexible region, to which a user writes, is preferably specified as said certain region.

12 Claims, 19 Drawing Sheets

FIG. 8

| FORM NO. | PAPER SIZE | REGION LOCATION 1 | REGION LOCATION 2 | REGION PROCESSING | NUMBER OF PAGES | DATE AND TIME OF REGISTRATION | ...... |
|---|---|---|---|---|---|---|---|
| 0001 | A4 | X COORDINATE N, Y COORDINATE M | | COMPRESSION | 1 | yyy/mm/dd | ...... |
| 0002 | A3 | X COORDINATE N, Y COORDINATE M | X COORDINATE A, Y COORDINATE B | COMPRESSION | 10 | yyy/mm/dd | ...... |
| ...... | ...... | ...... | ...... | ...... | ...... | ...... | |

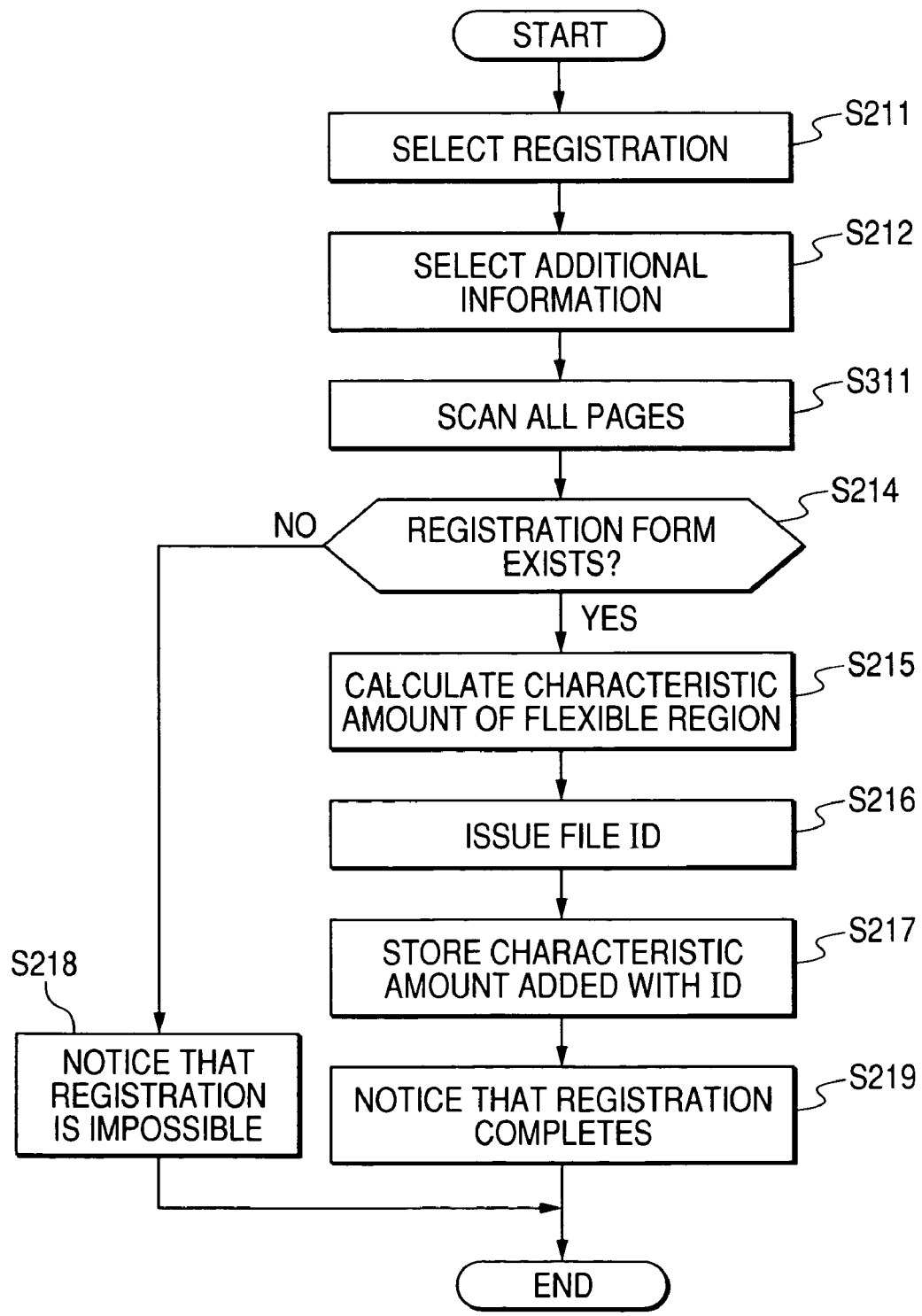

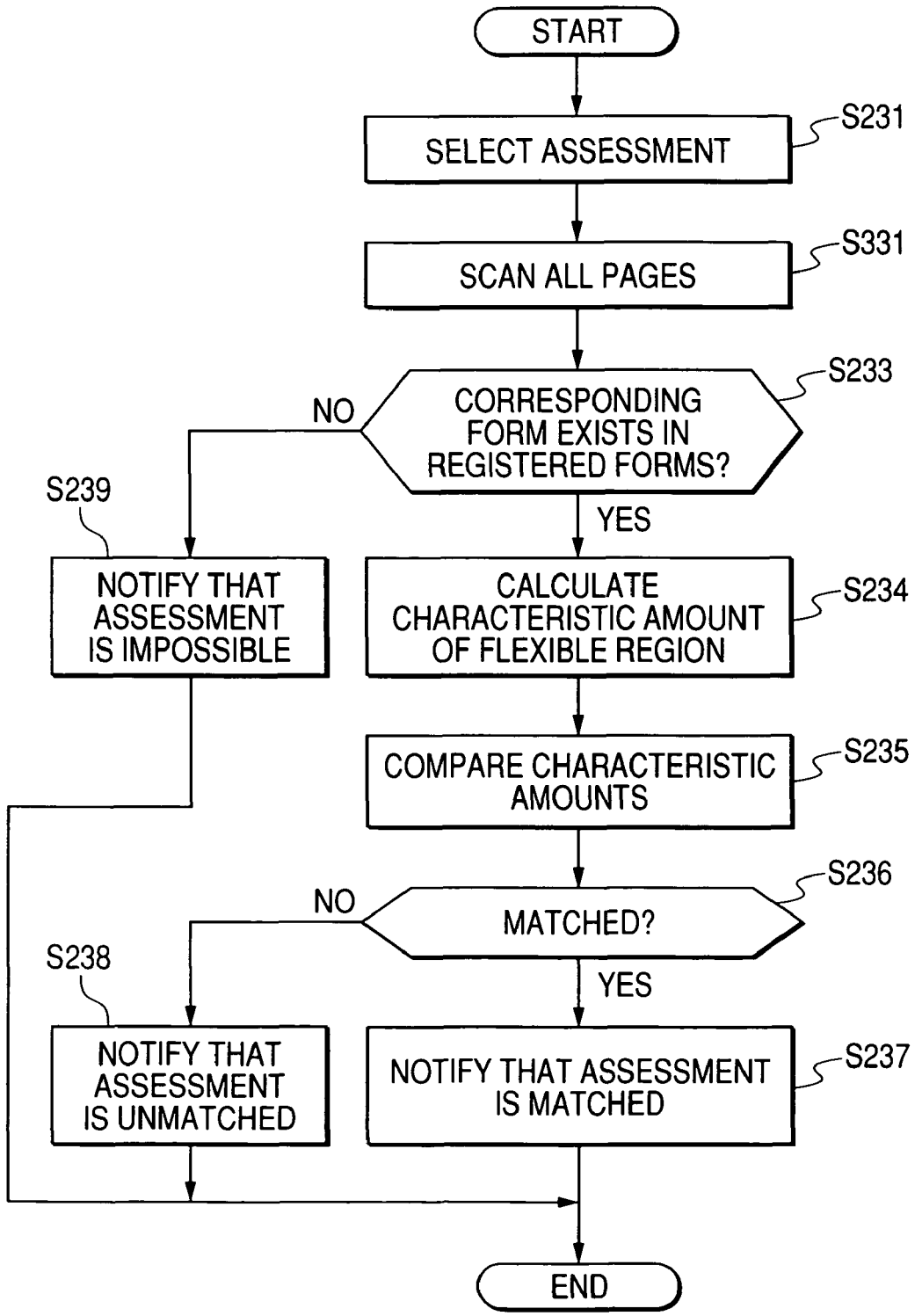

IMAGE PROCESSING SYSTEM AND IMAGE TAMPERING ASSESSMENT METHOD AND CONTROL PROGRAM OF THE SAME

BACKGROUND OF THE INVENTION

Technologies for assuring originality of a printed paper medium have been proposed. For example, a technology disclosed in Japanese Patent Application Laid-Open No. 2002-344736 superimposes digital watermark information such as certification information of original data on the original data and generates printing data including the watermark and prints the data on a paper medium. Degradation such as fading of ink in printing may make original/copy determination (originality assurance) according to its watermark information impossible. To solve this problem, a technology disclosed in Japanese Patent Application Laid-Open No. 2002-344736 calculates surviving watermark by verifying the watermark, compares the surviving watermark and surviving watermark extracted from generation management information, and performs determination of the original/copy by determining degradation caused by copying the original and that caused by copying afterwards.

The above technology disclosed in Japanese Patent Application Laid-Open No. 2002-344736, however, has a problem of a complicated configuration as the technology requires not only digital watermark information but also generation management information to be generated and a surviving watermark to be calculated and compared.

Originality assurance systems for performing a tampering assessment on a printed paper medium without using digital watermark information generally determines whether a paper medium to be assessed is tampered or not (whether it is same as the original) by comparing image information on the entire surface of the paper medium to be assessed and image information on the entire surface of the original paper medium.

Such an originality assurance system without using digital watermark information needs image information on the entire surface of a paper medium to assess tampering of the image on the paper medium and calculation for the entire surface to compare the paper medium to be assessed with the original paper medium.

SUMMARY OF THE INVENTION

In view of the abovementioned conventional problems, the present invention intends to reduce calculation time by alleviating the calculation load in assessing tampering of an image on a paper medium and simplify the configuration of the system.

To solve the abovementioned problems, the image processing system of the present invention includes:

original characteristic amount storing means for storing a characteristic amount of a certain region in an original image as a characteristic amount of the original image;

form checking means for checking a type of a form of an image to be assessed;

assessment characteristic amount extracting means for determining a certain region corresponding to the type of the form checked by the form checking means and extracting a characteristic amount of the certain region in the image to be assessed as a characteristic amount of the image to be assessed;

comparing means for comparing the characteristic amount of the image to be assessed extracted by the assessment characteristic extracting means and the characteristic amount of the original image stored in the original characteristic amount storing means; and notification means for notifying the compared result from the comparing means.

In order to solve the abovementioned problems, the image tampering assessment method of the present invention is an image tampering assessment method for controlling a device having an original characteristic amount storing means that stores a characteristic amount of a certain region in an original image as a characteristic amount of the original image, comprising:

a form checking step of checking a type of a form of an image to be assessed;

an assessment characteristic amount extracting step of determining a certain region corresponding to the type of the form checked in the form matching step and extracting a characteristic amount of the certain region in the image to be assessed as a characteristic amount of the image to be assessed;

a comparing step of comparing the characteristic amount of the image to be assessed extracted in the assessment characteristic extracting step and the characteristic amount of the original image stored in the original characteristic amount storing means; and a notification step of notifying the compared result in the comparing step.

In order to solve the abovementioned problems, the computer program of the present invention is a computer program for causing a computer to perform an image tampering assessment, wherein the program includes program codes for causing the computer to perform:

a form checking step of checking a type of a form of an image to be assessed;

an assessment characteristic amount extracting step of determining a certain region corresponding to the type of the form checked in the form matching step and extracting a characteristic amount of the certain region in the image to be assessed as a characteristic amount of the image to be assessed;

a comparing step of comparing the characteristic amount of the image to be assessed extracted in the assessment characteristic amount extracting step and the characteristic amount of a certain region of the original image stored in an original characteristic amount storing means; and a notification step of notifying the compared result in the comparing step.

The present invention can reduce calculation time by alleviating a calculation load in assessing tampering of an image and also can simplify the configuration of the system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram showing an example of form information stored at the form registration process;

FIG. 19 is a flowchart illustrating an original registration process according to the Second Embodiment; and FIG. 20 is a flowchart illustrating a tampering assessment process according to the Second Embodiment.

DESCRIPTION OF THE PREFERRED EMBODIMENTS

The accompanying drawings, which are incorporated in and constitute a part of the specification, illustrate embodiments of the invention and, together with the description, serve to explain the principles of the invention.

Embodiments of an image processing system and an image tampering assessment method and a control program of the same of the present invention will be described with reference to the drawings.

First Embodiment

[Configuration of an Image Processing System of the First Embodiment]

Figure 1:
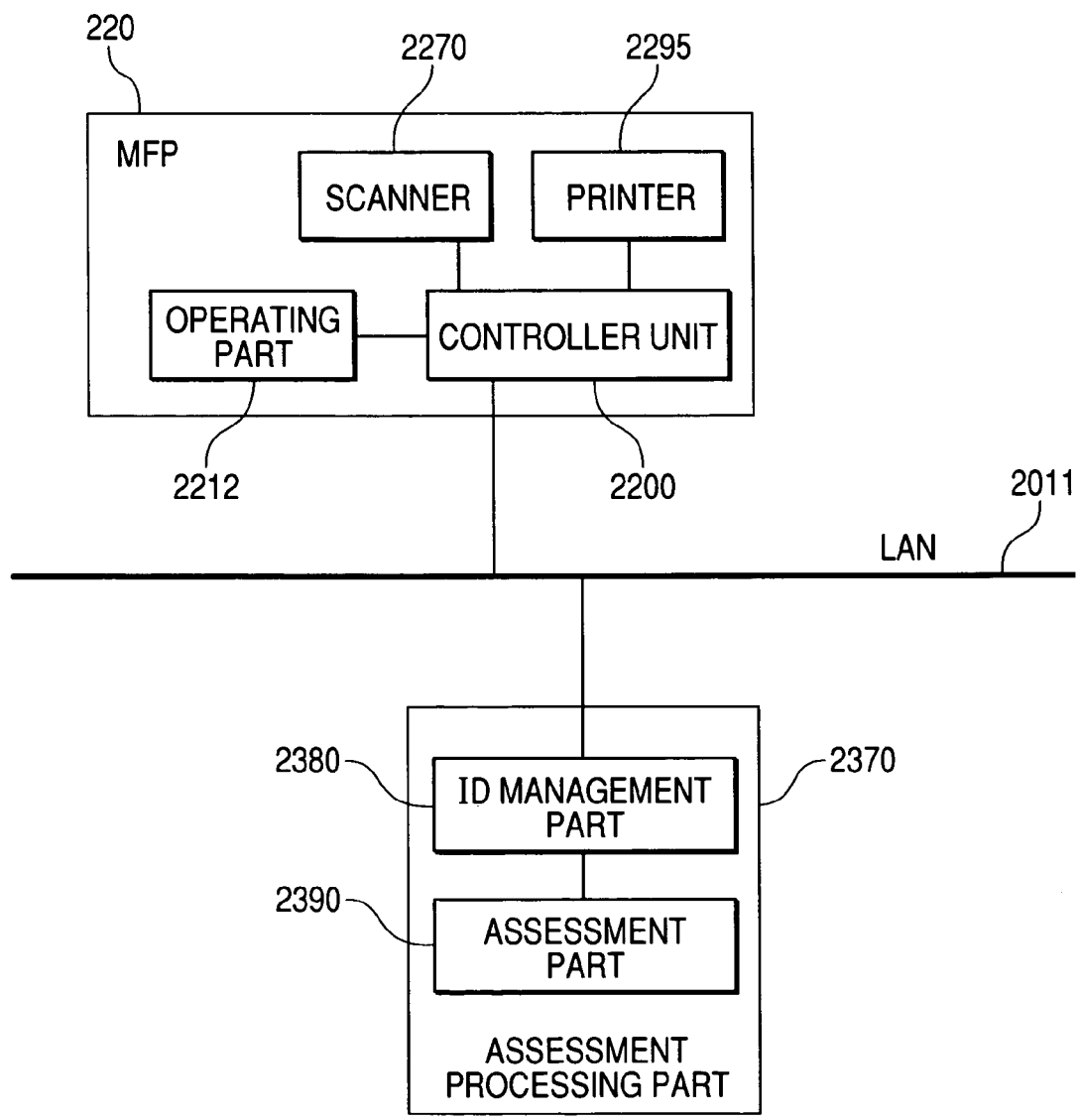
FIG. 1 is a block diagram for illustrating a configuration of an image processing system of a First Embodiment of the present invention.

FIG. 1 is a block diagram for illustrating a configuration of an image processing system of a First Embodiment of the present invention.

This image processing system includes a Multi Function Peripheral (hereinafter referred to as MFP) 220 and an assessment processing part 2370, each of which is connected on a local area network (LAN) 2011.

The MFP 220 has a scanner 2270, which is an image inputting device, a printer 2295, which is an image outputting device, a Controller Unit 2200 and an operating part 2212, which is a user interface. Each of the scanner 2270, the printer 2295 and the operating part 2212 is connected with the controller unit 2200 and controlled by instructions from the controller unit 2200. The controller unit 2200 is connected with a network transmission means such as a LAN 2011.

The assessment processing part 2370 includes an ID management part 2380 and an assessment part 2390 and controlled by the controller unit 2200. The ID management part 2380 registers and manages a characteristic amount of a certain region of an original paper medium to be described later for each ID. The assessment part 2390 compares whether a characteristic amount of a paper medium to be assessed and a characteristic amount already registered in the ID management part 2380, and assesses the occurrence of tampering on the paper medium to be assessed.

The MFP other than MFP 220 may be connected with the LAN 2011. The assessment processing part 2370 may be configured to be in the MFP 220.

<Configuration of a Controller Unit of an MFP>

Figure 2:
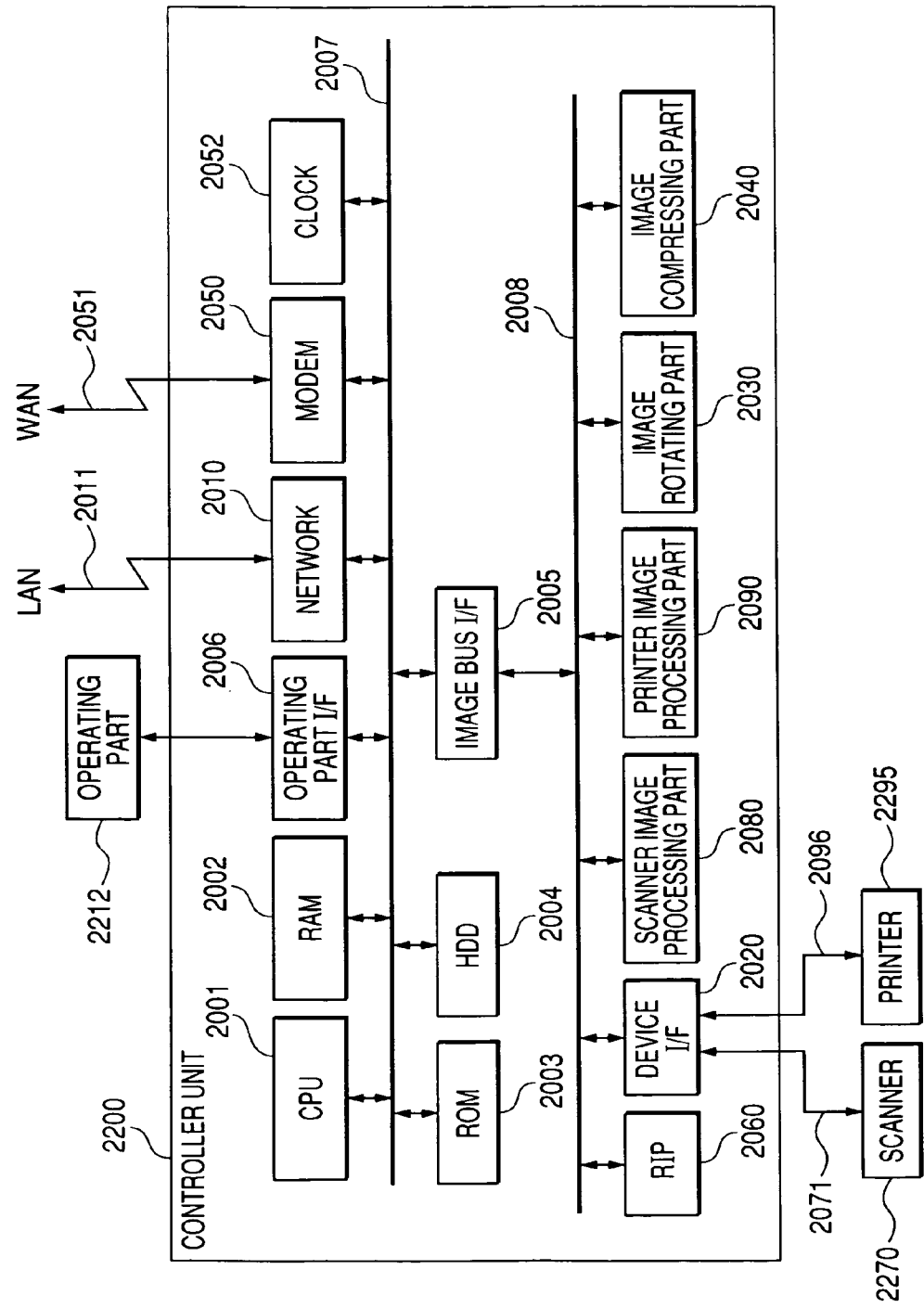
FIG. 2 is a block diagram for illustrating a detailed configuration of a controller unit of the MFP shown in FIG. 1.

FIG. 2 is a block diagram for illustrating a detailed configuration of a controller unit of the MFP 220 shown in FIG. 1.

The controller unit 2200 is connected with a scanner 2070, which is an image inputting device, and a printer 2095, which is an image outputting device, and also connected with the LAN 2011 or a public circuit (WAN) 2051 for inputting and outputting image information and device information.

In the controller unit 2200, a CPU 2001 controls the entire system and also controls an inner clock 2052. RAM 2002 is system work memory used to operate the CPU 2001 and also image memory for temporally storing image data. ROM 2003 is boot ROM that stores a boot program of the system. An HDD 2004 is a hard disk drive and stores system software and image data as well as control information of an image processing algorithm required for performing an original assurance operation to be described later.

An operating part I/F 2006 is responsible for the interface with the operating part (UI) 2212 and outputs image data to be displayed on the operating part 2212 to the operating part 2212. The operating part I/F 2006 also responsible for communicating information inputted by a user via the operating part 2212 to the CPU 2201.

A Network interface 2010 is responsible for connection with the LAN 2011 and inputs/outputs information to/from the LAN 2011. A MODEM 2050 is responsible for connection with the public circuit (WAN) 2051 and inputs/outputs information to/from the public circuit. The clock 2052 manages a standard time for indicating time or a weekly timer function. Each of the abovementioned devices is located on a system bus 2007.

An Image Bus I/F 2005 is a bus bridge for connecting the system bus 2007 with an image bus 2008, which transfers image data at a high speed and converts data structures. The image bus 2008 includes a PCI bus or IEEE 1394.

A raster image processor (RIP) 2060, a device I/F part 2020, a scanner image processing part 2080, a printer image processing part 2090, an image rotating part 2030 and an image compressing part 2040 are connected to the image bus 2008.

The raster image processor (RIP) 2060 decompresses a PDL code sent from a network to a bit map image. The device I/F part 2020 connects the scanner 2270 or the printer 2295 with the controller unit 2200 and synchronously/asynchronously converts image data. The scanner image processing part 2080 calculates, recognizes, corrects, processes and edits a characteristic amount for an input image data. The printer image processing part 2090 performs processing including correction, conversion of resolution and addition of electronic information for print output image. The image rotating part 2030 rotates image data and the image compression part 2040 performs JPEG compression/decompression on multivalued image data and compression of JBIG, MMR, MH on binary image data.

<External View of an Operating Part of an MFP>

Figure 3:
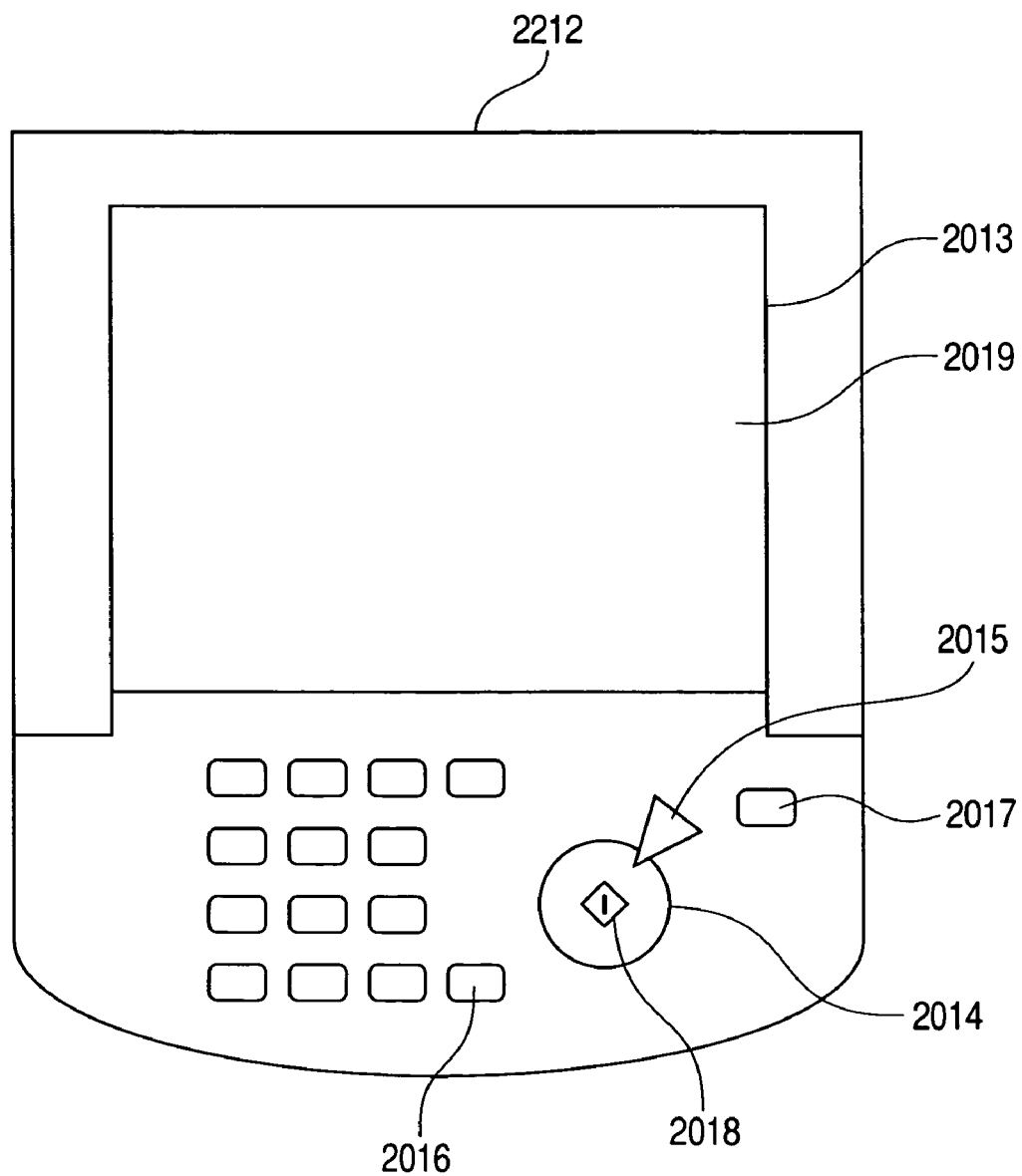
FIG. 3 is a diagram showing an external view of the operating part shown in FIG. 1.

FIG. 3 is a diagram showing an external view of an operating part shown in FIG. 1.

As shown in the figure, a touch panel sheet 2019 is affixed to an LCD display part 2013. The touch panel sheet 2019 displays an operating screen and soft keys for the system. When the displayed key is pressed, location information indicating the pressed place is communicated to a CPU (Not shown), which controls the operating part 2212.

A start key 2014 is used for starting a reading operation of a paper medium image. The start key 2014 has a LED display part 2018 in two colors of green and red in the center for indicating whether the start key 2014 is available or not with the colors. A stop key 2015 functions to stop an operation in-service. An ID key 2016 is used for inputting a user ID of a user. A reset key 2017 is used for initializing the setting set by the operating part 2212.

[Operation of the First Embodiment]

The original assurance operation of the image processing system with the abovementioned configuration will be described.

In this original assurance operation, a template form is previously registered and an original paper medium created according to the template form is registered. Then, in order to confirm the originality assurance of the paper medium to be assessed, a tampering assessment process is performed. The process will be described in detail by taking a case that a tampering assessment process is performed on an insurance policy, for example, as an example below.

<Example of Template Form>

Figure 4:
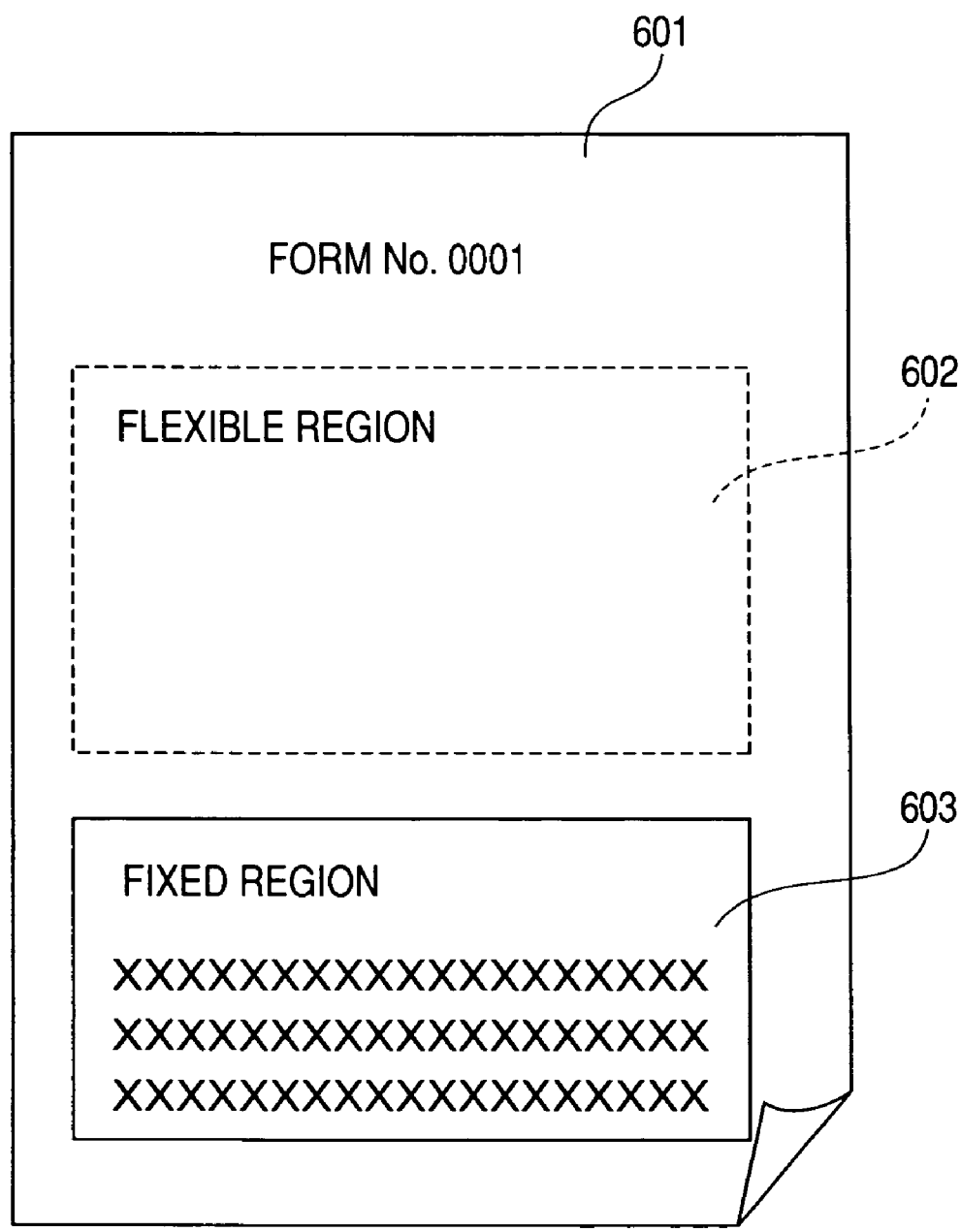
FIG. 4 is a diagram showing an example of a template form sheet according to the embodiment.

FIG. 4 is a diagram showing an example of a template form sheet according to the embodiment.

A template form sheet 601 includes a fixed region 603, on which specific information corresponding to each template form is previously stored, and a flexible region 602, which is specified in a template form registration process to be described later, in the space outside the fixed region 603. The flexible region 602 is a region for flexible information being written when an original is created.

For example, it is assumed that an insurance policy in form A has an insurance policy (a policy of the insurance) previously printed, and completed when date and person's name are written by hand. In this case, the flexible region 602 is a region for information including date, person's name and date of birth to be written by hand, while the fixed region 603 is a region, on which printed information such as an insurance policy is recorded. In other words, the flexible region 602 is a region, tampering on which causes a serious problem, and the fixed region 603 is a region, tampering on which causes little problem.

<Registration Process of a Template Form According to the First Embodiment>

Next, process for scanning the abovementioned template form sheet and registering the template form will be described with reference to FIGS. 5-8. This registration process is mainly implemented by a scanner image processing part 2080.

Figure 5:
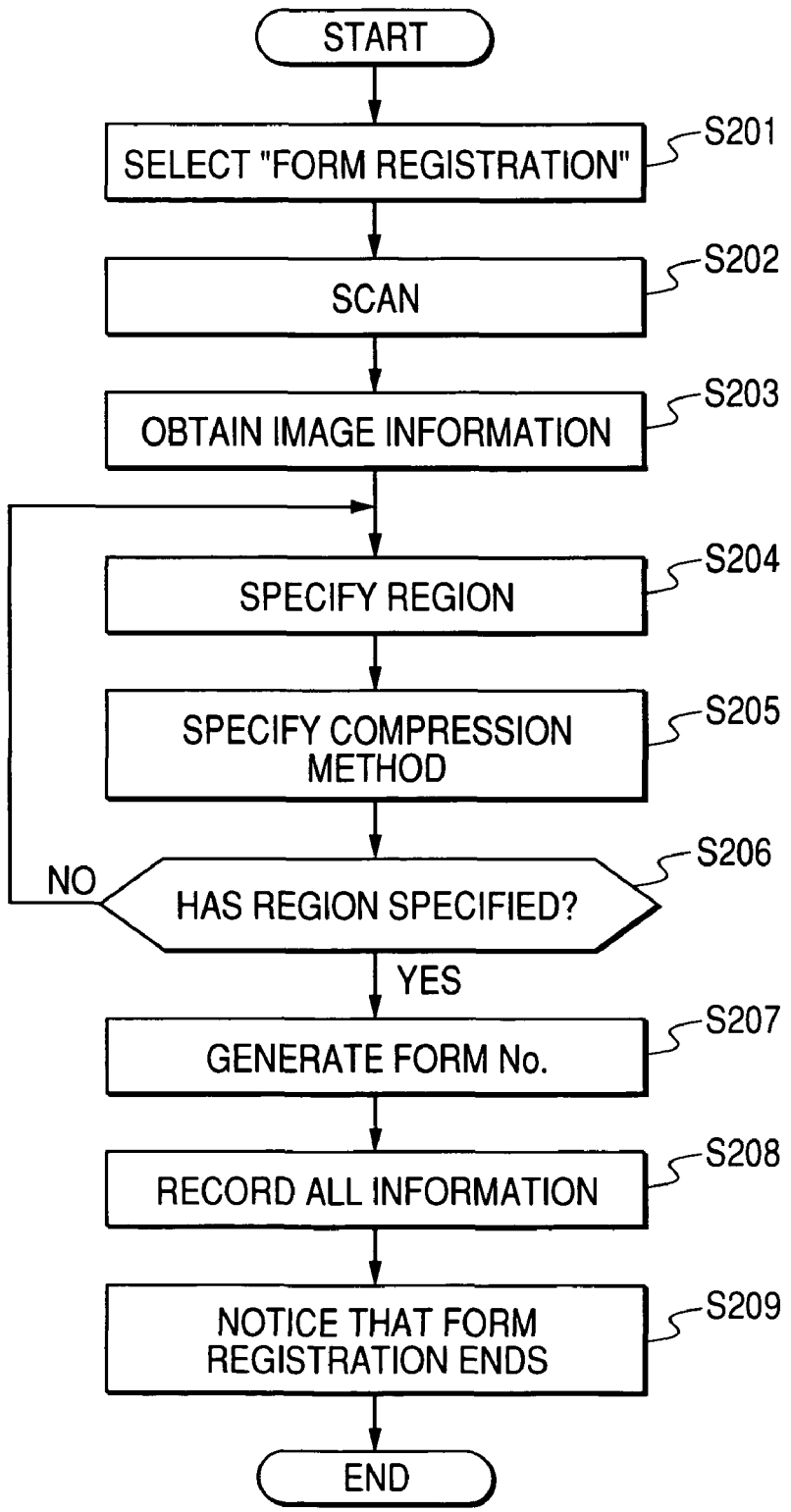
FIG. 5 is a flowchart illustrating a form registration process according to the First Embodiment.
Figure 6:
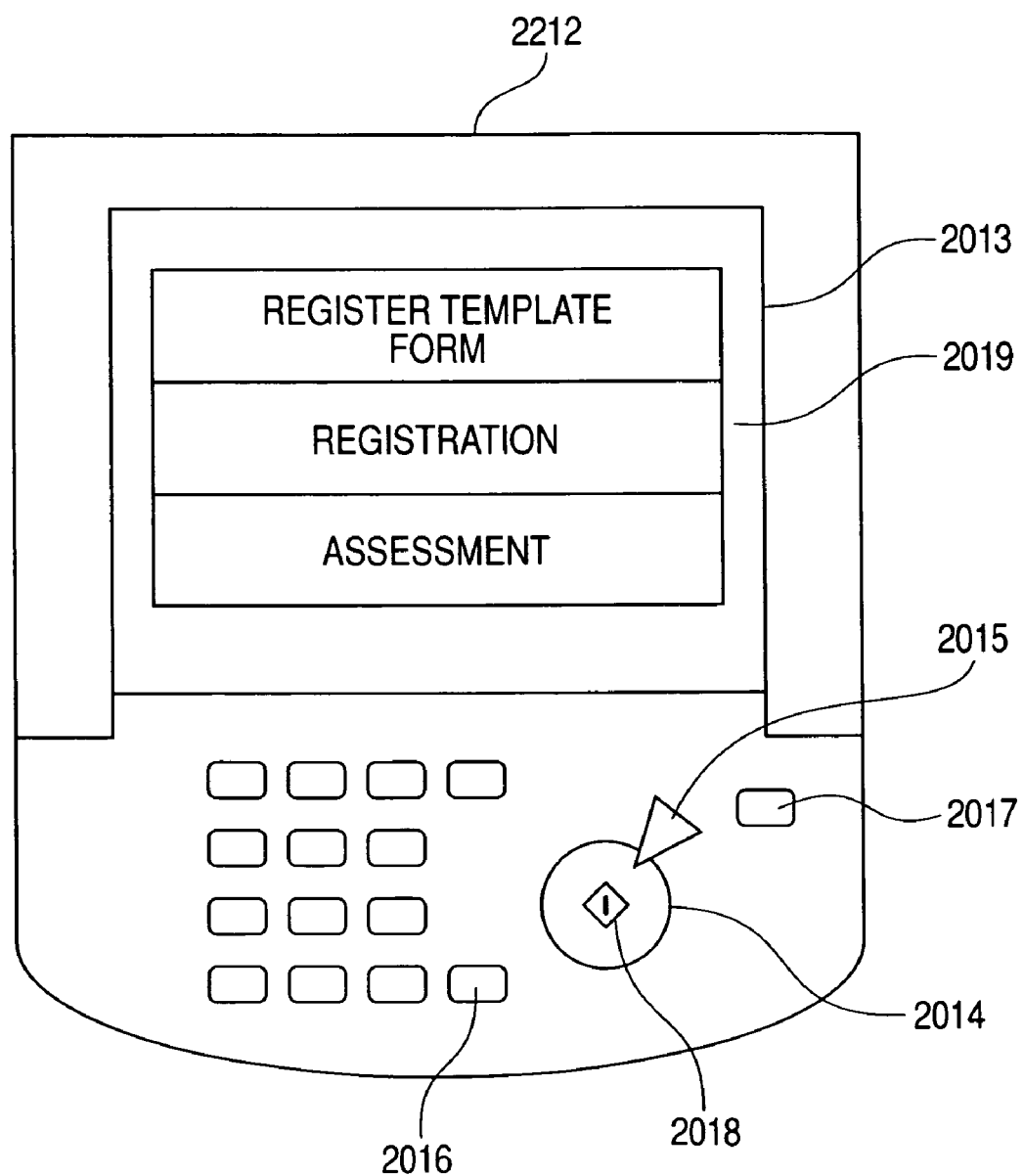
FIG. 6 is a diagram showing a menu screen displayed on an LCD display of the operating part.
Figure 7:
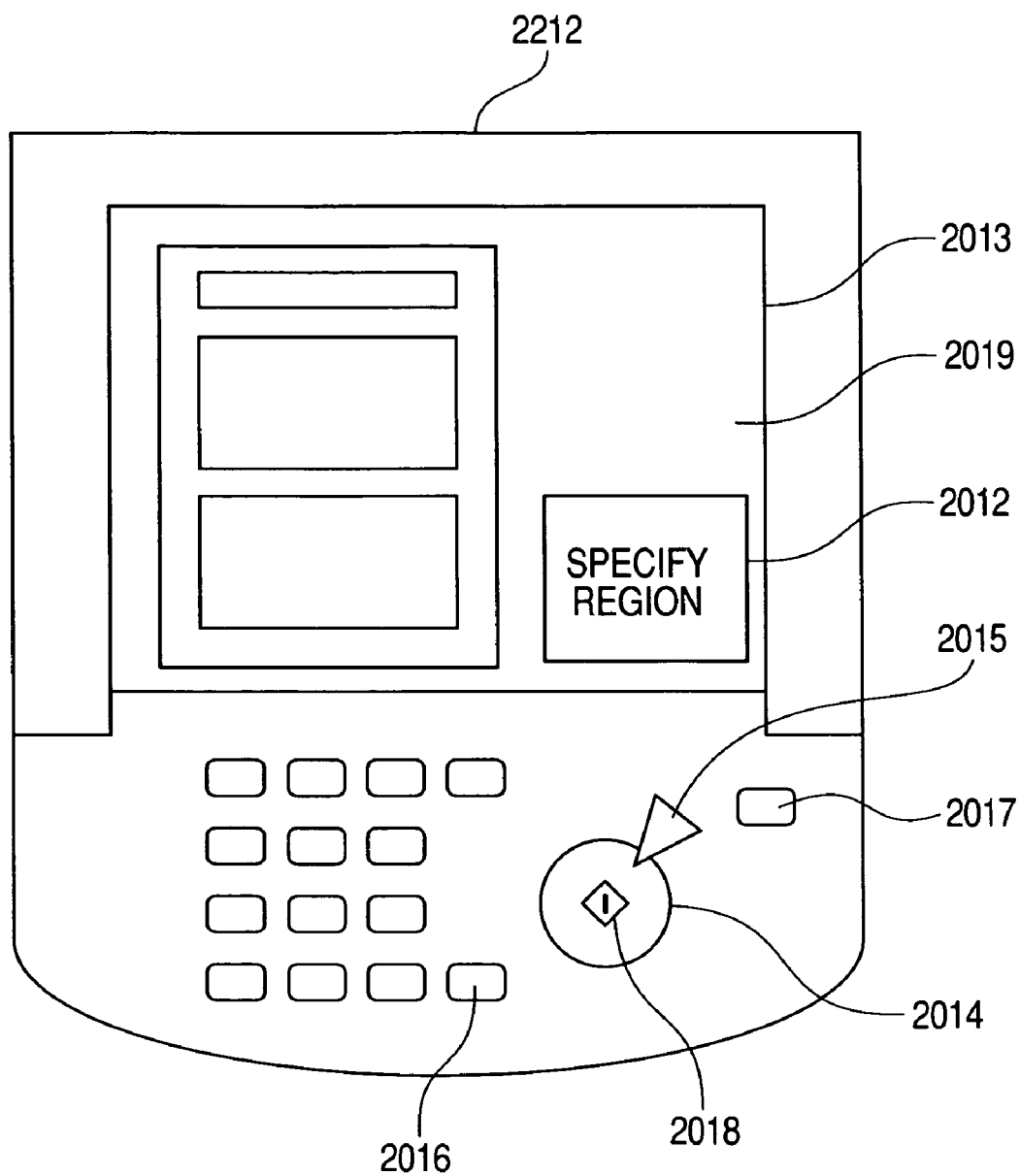
FIG. 7 is a diagram showing a display screen used to specify a region for the form registration process.

FIG. 5 is a flowchart illustrating a form registration process according to the First Embodiment. FIG. 6 is a diagram showing a menu screen displayed on an LCD display 2013 of the operating part 2212 for selecting the execution of each process. FIG. 7 is a diagram showing a display screen used to specify a region for the form registration process. FIG. 8 is a diagram showing an example of form information stored at the form registration process.

First, a user sets a template form sheet (a single sheet) of an insurance policy in form A, for example, on a reading part of the scanner 2270 and has a menu screen displayed on the LCD display part 2013 of the operating part 2212 as shown in FIG. 6, and selects "Register template form" from the menu (step S201). Then, a scanning operation starts and image information on the template form sheet set on the reading part is read in the MFP 220 (step S202).

After obtained the image information on the template form sheet (step S203), the user specifies a flexible region 602 on the LCD display part 2013 of the operating part 2212 for the obtained image information. That is to say, the user specifies the flexible region 602 from the image information of the template form sheet displayed on the LCD display part 2013 of the operating part 2212 by using a cursor 2017 and a region specifying button 2012 as shown in FIG. 7 (step S204). As a way for specifying the flexible region 602, a way for specify it with encoded information being previously embedded in a space on a template form, for example, can be used other than the way for a user to specify it on the operating part 2212.

Then, the user specifies a compression method as a processing method of the specified flexible region 602 (step S205). When the user wants to specify a plurality of flexible regions 602, the user repeats steps S204, S205 and S206 until the user completes the specification of all the regions.

The specific number (for example, form No. 0001) is generated in order to create form information corresponding to the scanned template form sheet (step S207), and information including a form name, a division to be registered and name of a person to be registered, which the user inputs from the operating part 2212 is added along with information automatically obtained after the process described here (for example, sheet size, region location, region processing, number of pages and date and time of registration). Such form information on template form sheet is stored in a predetermined storage region in the HDD 2004 or the like in a form of table as shown in FIG. 8 (step S208).

Then, the user is notified of the completion of the form registration (step S209) and the form registration process ends.

By repeating such a template form registration process, information on a plurality of types of template form of an insurance policy such as form A, form B, form C and the like can be registered in the MFP 220 in the order of the form numbers specific to the forms.

<Original Registration Process According the First Embodiment>

Figure 9:
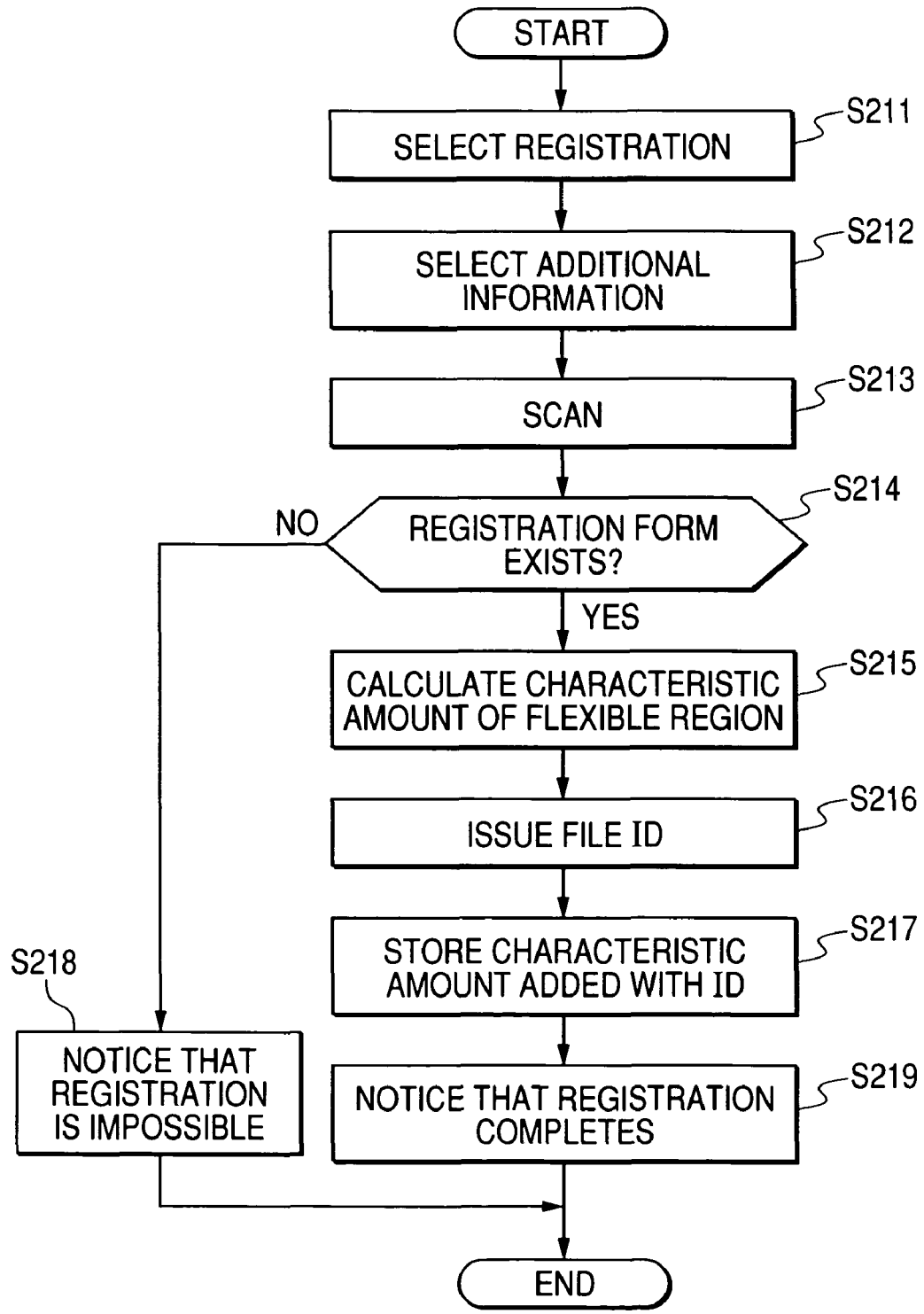
FIG. 9 is a flowchart illustrating an original registration process according to the First Embodiment.
Figure 10:
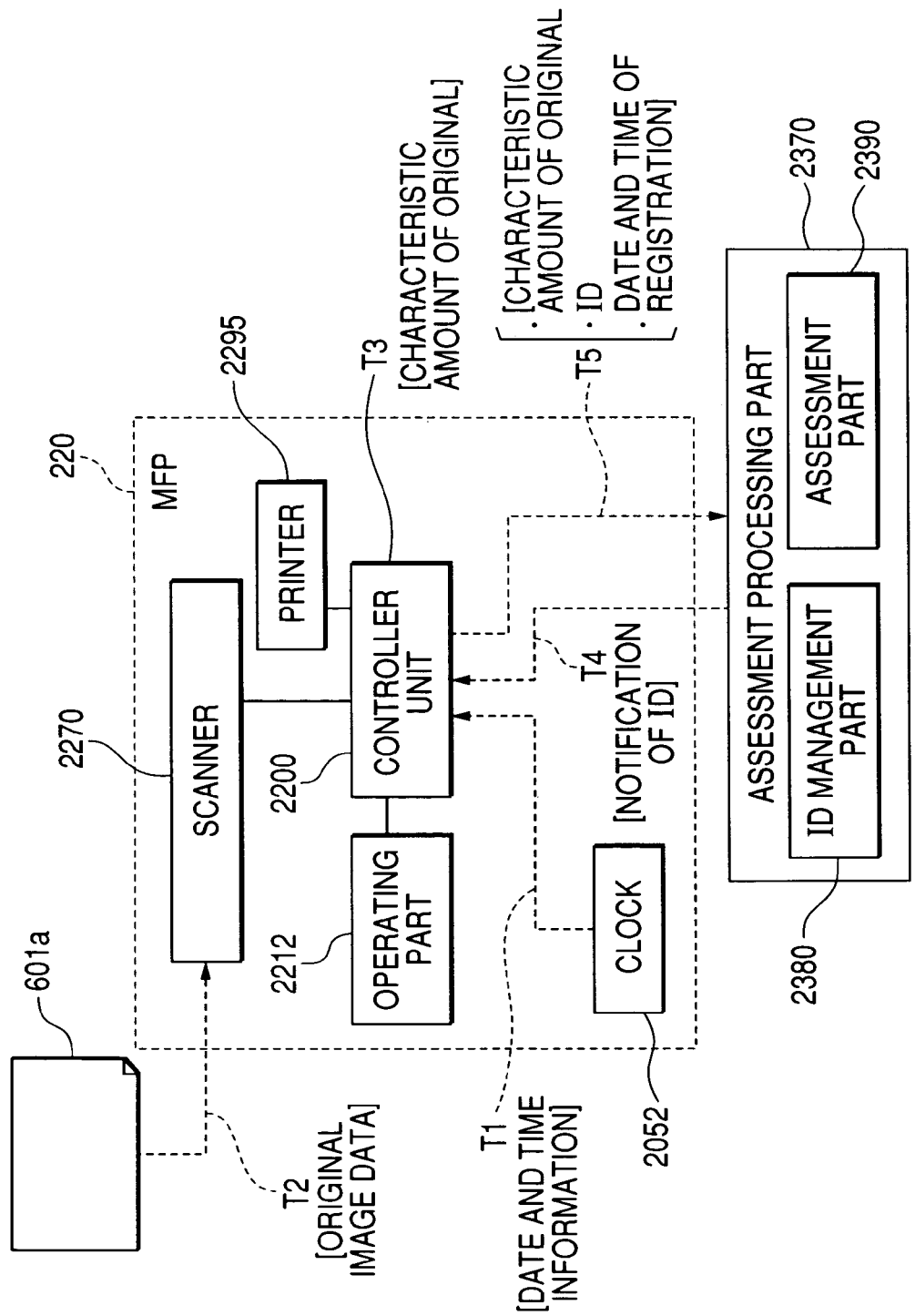
FIG. 10 is a conceptual diagram showing a data flow at the original registration process.
Figure 11:
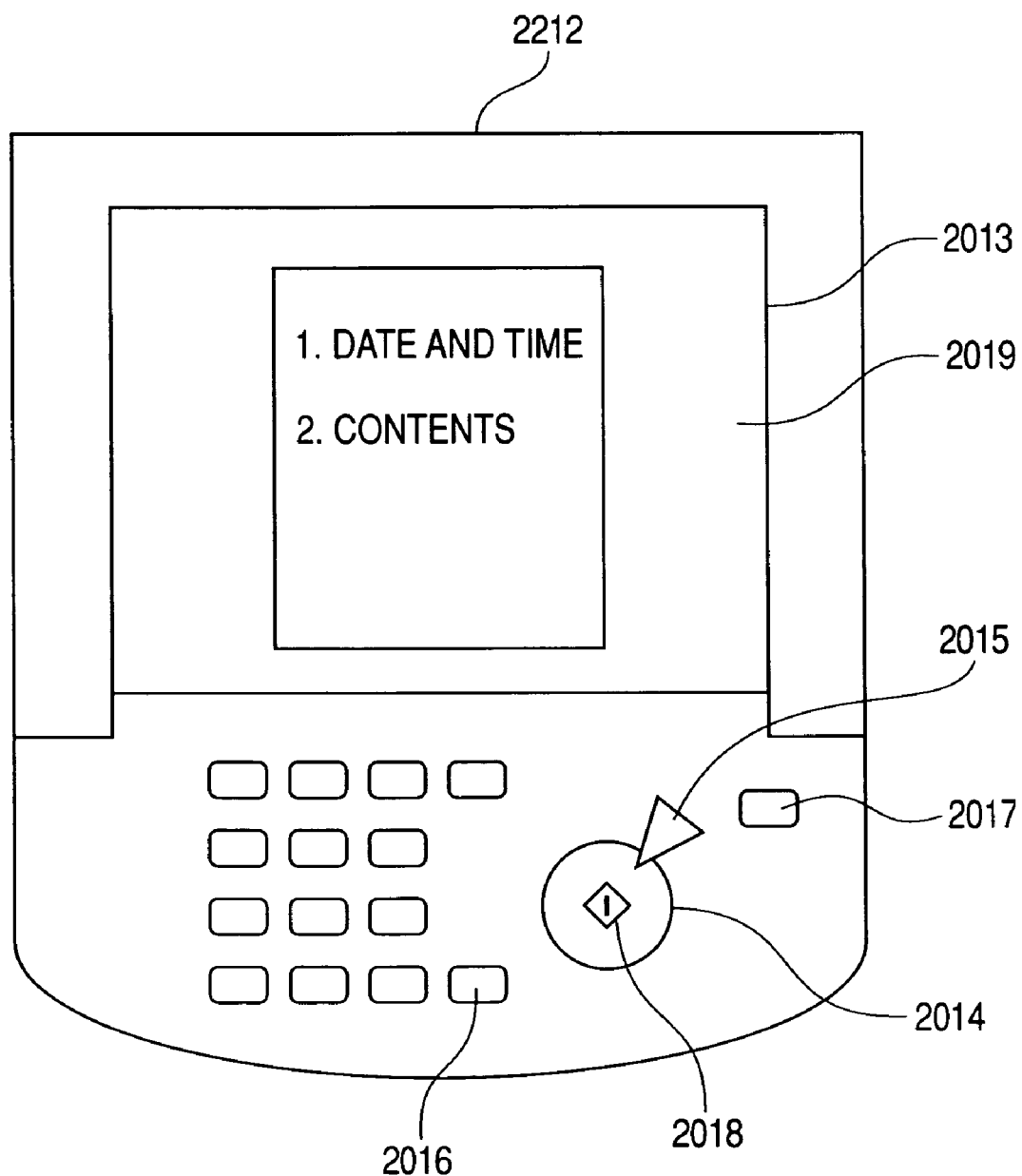
FIG. 11 is a diagram showing a screen of the operating part when additional information is selected.

Next, the original registration process according to the embodiment will be described with reference to FIGS. 9, 10 and 11. FIG. 9 is a flowchart illustrating an original registration process according to the First Embodiment. FIG. 10 a conceptual diagram showing a data flow at the original registration process. FIG. 11 is a diagram showing a screen of the operating part 2212 when additional information is selected.

First, an operator sets an original paper medium 601a on a reading part of the scanner 2270 (FIG. 10). The original paper medium 601a is a completed original insurance policy of an insurant with the flexible region 602 specified on a template form sheet of the abovementioned insurance policy (form A), for example, (601 in FIG. 4) filled with date, name of a person, date of birth, for example, as flexible information.

Next, the user selects "Registration" on the menu screen shown in FIG. 6 on the operating part 2212 (step S211), then selects information to be added to assure the original (additional information) (step S212). As additional information, date of registration and what registered are prepared as shown in FIG. 11 allowing the operator to select required registering information. The date of registration is obtained from date and time information in the clock part 2052 (T1 of FIG. 10).

When the additional information is decided, the controller unit 2200 scans the original paper medium 601a with the scanner 2270 and read image information on the original paper medium (step S213, T2). Then, the controller unit 2200 checks the form information of the original paper medium against a plurality types of form information (form information on form A, form information on form B, . . . ) registered for each form number at the abovementioned template form registration process by using the read original paper medium (step S214).

If forms match by checking at step S214, it means that the original paper medium is assured to have been completed by using a registered authentic template form. If forms do not match at checking at step S214, a notice that registration is impossible meaning that the original paper medium cannot be registered is displayed on the LCD display part 2013 of the operating part 2212 (step S218).

If the form of the original paper medium matches an already registered authentic form, a location of a flexible region corresponding to the form (type of the form) is determined based on FIG. 5 and a characteristic amount of the flexible region 602 in the original paper medium is calculated (step S215, T3). This calculation will be described later. If a code for specifying a flexible region is previously embedded in a template form, this code is recognized and a region detected by using this code is detected as the flexible region 602 and the characteristic amount is calculated.

Then, a file ID is issued from the assessment processing part 2370 (step S216, T4), the file ID is added to the calculated characteristic amount of the flexible region 602 and the assured additional information and stored in the ID management part 2380 in the assessment processing part 2370 (step S217, T5), the controller unit 2200 is notified of the completion of the registration process (step S219) and the original registration process finishes.

Next, the characteristic amount calculation process (step S215) in FIG. 9 will be described with reference to FIGS. 12, 13, 14, 15A and 15B.

Figure 12:
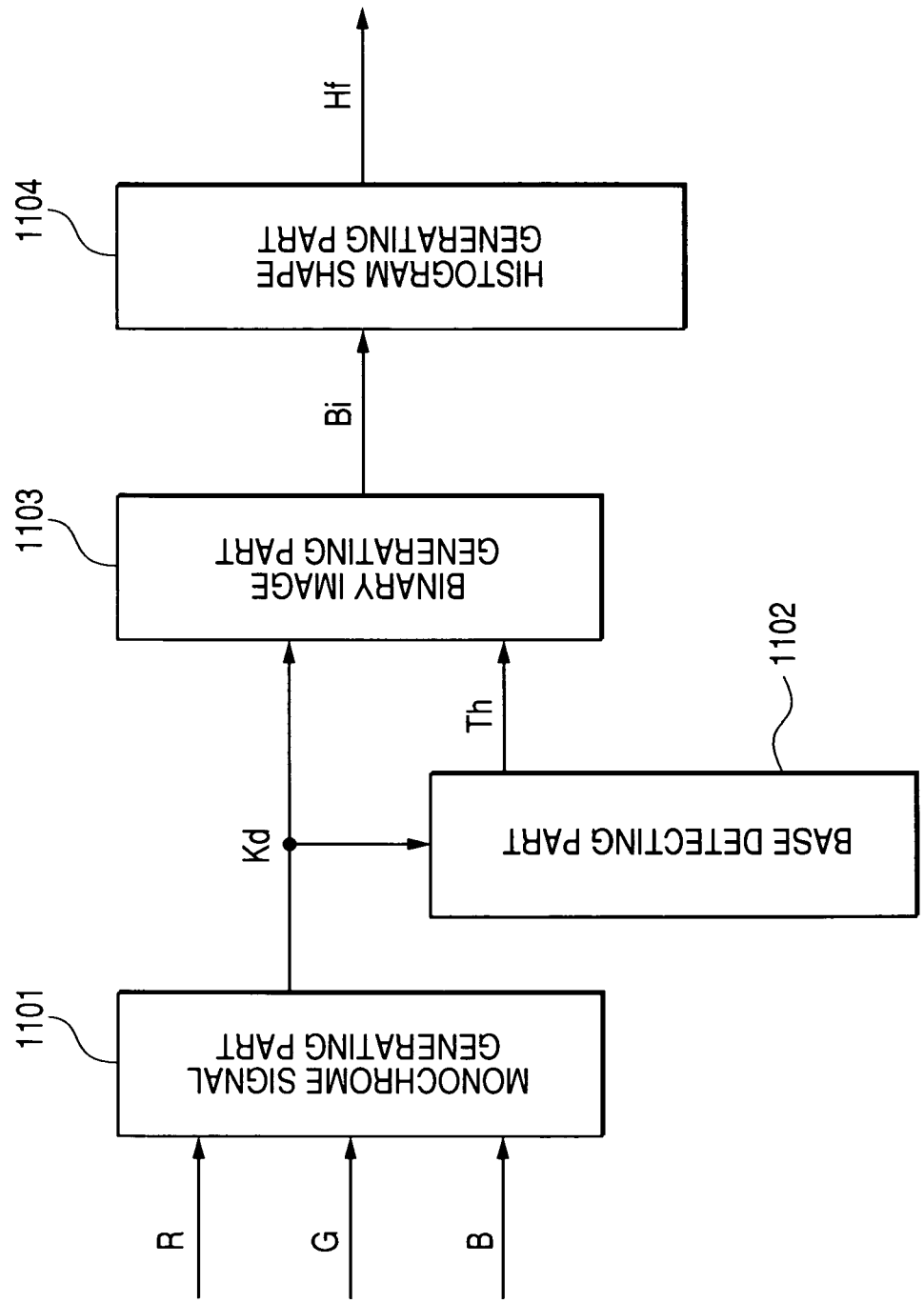
FIG. 12 is a block diagram showing a functional configuration of substantial parts in a scanner image processing part that performs the characteristic amount calculation process in FIG. 9.
Figure 13:
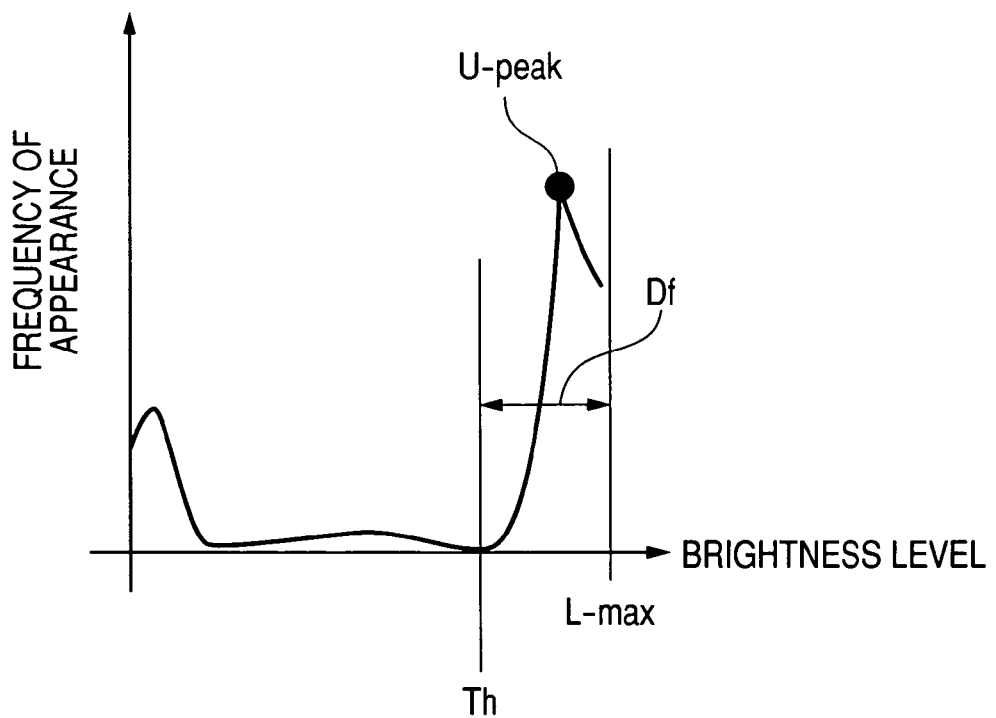
FIG. 13 is a graph snowing frequencies of a brightness signal calculated from an original paper medium.
Figure 14:
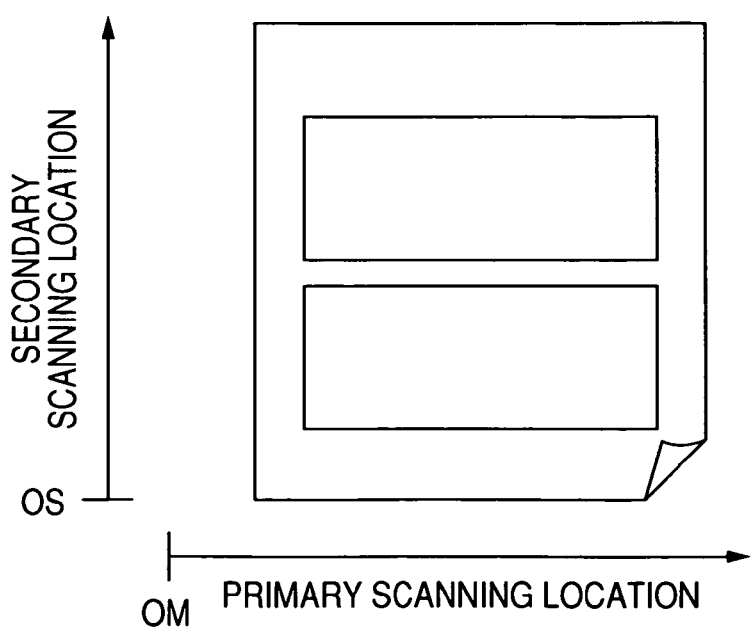
FIG. 14 is a diagram showing physical relationship for creating a histogram.
Figure 15A:
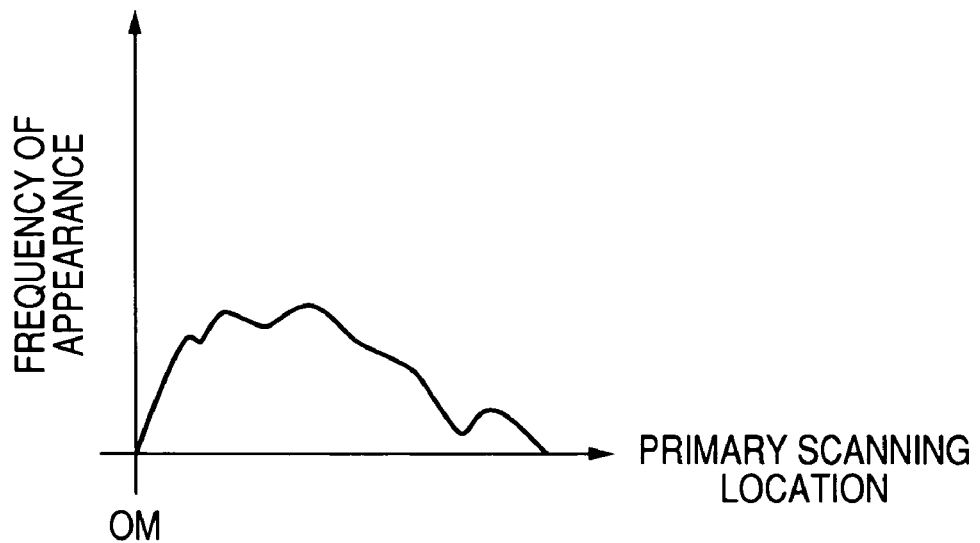
FIG. 15A and FIG. 15B are graphs showing histograms.
Figure 15B:
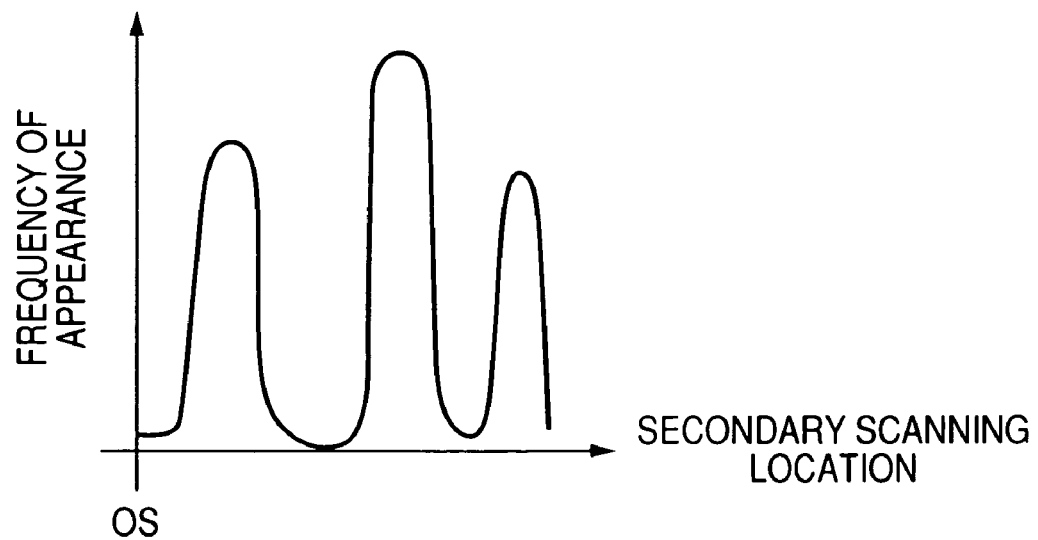

FIG. 12 is a block diagram showing a functional configuration of substantial parts in a scanner image processing part 2080 that performs the characteristic amount calculation process in FIG. 9. FIG. 13 is a graph snowing frequencies of brightness signal calculated from an original paper medium 601. FIG. 14 is a diagram showing a physical relationship for creating a histogram. FIG. 15A and FIG. 15B are graphs showing histograms with FIG. 15A representing a histogram in the primary scanning direction and FIG. 15B representing a histogram in the secondary scanning direction, respectively.

First, the image read by the scanner 2270 is decomposed into digital signals of three primary colors of red (R), green (G) and blue (B), and the characteristic amount is calculated by the scanner image processing part 2080. The calculation of the characteristic amount will be described in detail below. In the description below, an image corresponding to a flexible region is considered to be processed.

Signals R, G and B are converted into a monochrome signal Kd by the expression below at a monochrome signal generating part 1101.

$$Kd = (R + 2 \times G + B)/4 \quad (1)$$

In the expression (1), the brightness signal is obtained by averaging the digital signals of three primary colors by multiplying the signal G by the gain double that of R and B. The brightness signal is not limited to be generated by the expression (1) and can be calculated based on a coefficient defined by the NTSC, for example.

The obtained brightness signal Kd is inputted in a base detecting part 1102, where a base level of the image of a template form sheet is detected. In FIG. 13, the abscissa indicates brightness signal levels (0-255) and the ordinate indicates frequencies. "L-max" in FIG. 13 indicates the measurable maximum brightness level (in this example, 255) and "U-peak" indicates the maximum frequency. As a template form sheet is considered as an image manuscript mainly including text in this embodiment, most part of the base is represented by light colors and U-peak is at the region with high lightness level as shown in FIG. 13.

When U-peak is detected, the process at the base detecting part 1102 finishes by making the brightness value, which is obtained by subtracting the Df level shown in FIG. 13 from U-peak, as a base level Th. Although Df is considered as a fixed value in the embodiment, it can be changed according to the shape of the histogram.

The base level Th detected by the base detecting part 1102 is sent out to the following binary image generating part 1103 where it is converted into a binary image ("0" and "1") from the monochrome signal Kd through the comparison of the expression below with the threshold Th.

if (Kd≦Th) then Kd=1 else Kd=0

Accordingly, the part darker than the threshold signal Th is converted into "1", and the part lighter than the threshold signal Th is converted into "0". A binary image Bi generated at the binary image generating part 1103 is sent out to the following histogram shape generating part 1104.

At the histogram shape generating part 1104, dark pixels "1" are counted for each pixel location. In FIG. 14, OM and OS represent the primary scanning direction and the secondary scanning direction, respectively, and the histogram is generated into respective directions based on the reference locations. FIG. 15A is a histogram in the primary scanning direction and FIG. 15B is a histogram in the secondary scanning direction, respectively. The obtained histogram values in primary and secondary directions are temporally saved in the RAM 2002 in the form of one-dimensional LUT (lookup table) as characteristic amounts of the image.

The calculation algorithm of the characteristic amount implemented at the scanner image processing part 2080 has been described.

<Tampering Assessment Process of the First Embodiment>

Next, the tampering assessment process according to the First Embodiment will be described with reference to FIGS. 16 and 17. This tampering assessment process is for assessing the occurrence of tampering on a paper medium to be assessed such as an already issued insurance policy.

Figure 16:
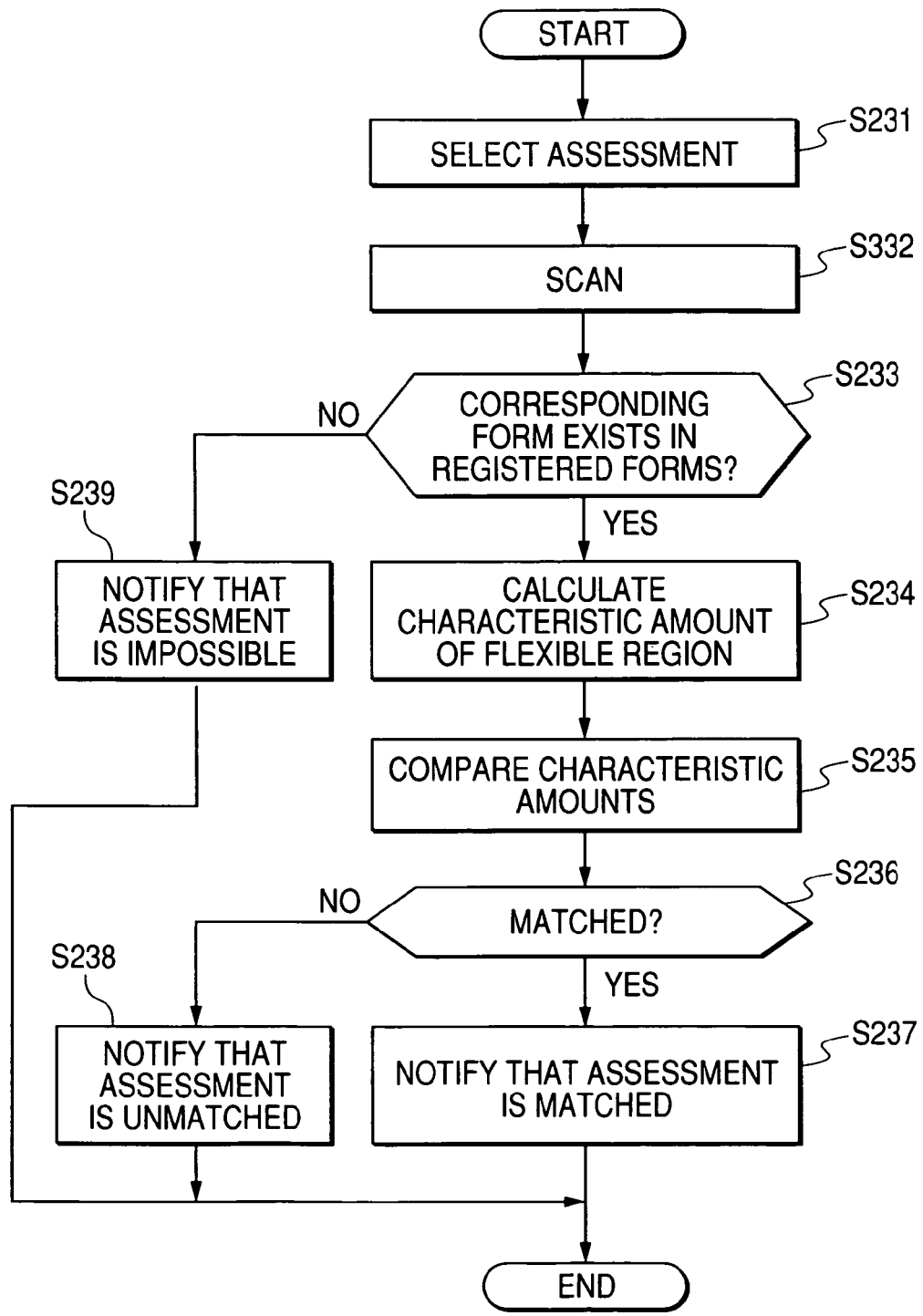
FIG. 16 is a flowchart illustrating a tampering assessment process according to the First Embodiment.
Figure 17:
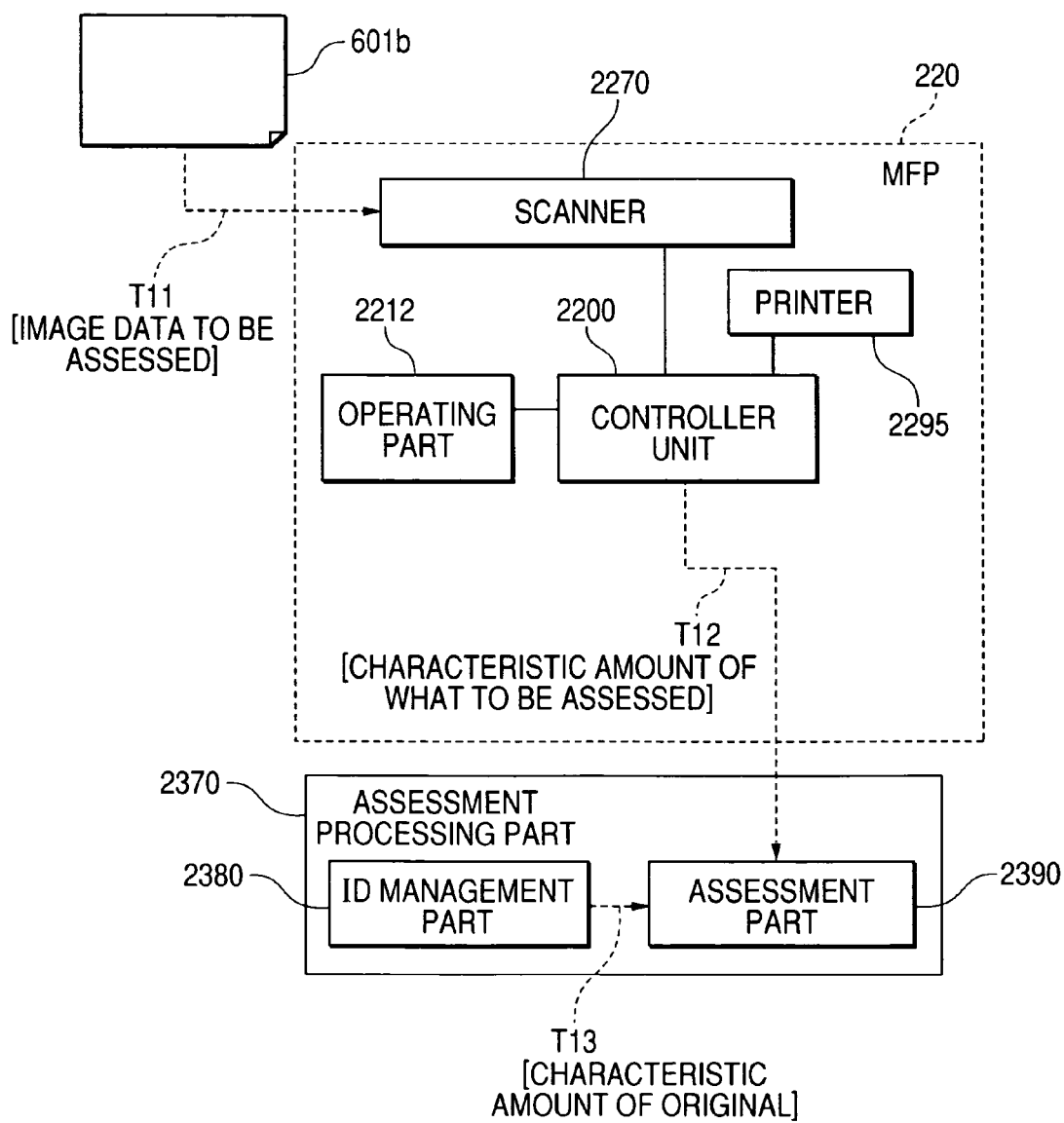
FIG. 17 is a conceptual diagram showing a data flow in the tampering assessment process.

FIG. 16 is a flowchart illustrating a tampering assessment process according to the First Embodiment. FIG. 17 is a conceptual diagram showing a data flow at tampering assessment process.

An operator sets a paper medium to be assessed 601b on a reading part of the scanner 2270 (FIG. 17) and selects "Assessment" on a menu screen shown in FIG. 6 at the operating part 2212 (step S231). Then, the controller unit 2200 performs the same sequence of process as that of the abovementioned original registration process, to step S234. That is to say, the controller unit 2200 scans the paper medium to be assessed 601b, reads in the image information (step S232, T11), checks the form information of the paper medium to be assessed against a plurality types of form information previously registered at the abovementioned template form registration process (step S233). If the forms can be confirmed as matched, the location of the flexible region corresponding to the form (type of the form) is determined based on FIG. 5, the flexible region 602 of the paper medium to be assessed is detected, the characteristic amount of the flexible region is calculated (step S234) and sent to the assessment part 2390 of the assessment processing part 2370.

Next, the characteristic amount of the flexible region 602 of the paper medium to be assessed and the characteristic amount of the flexible region 602 of the original, which is registered at the abovementioned original registration process are compared at the assessment part 2390 (step S235). If the characteristic amounts match, i.e., if they are determined as the same characteristic amount (step S236), the assessment part 2390 notifies the controller unit 2200 of the result that they are assessed as matched (No tampering) (step S237). If they are determined as unmatched (step S236), the assessment part 2390 notifies the controller unit 2200 of the result that they are assessed as unmatched (Tampered) (step S238). Then the process finishes.

If forms cannot be confirmed as matched at step S233, the controller unit 2200 is given a notification that the assessment is impossible (step S239) and the process finishes.

<Comparing Process of Characteristic Amounts According to the Embodiment>

The comparing process of the characteristic amounts at the abovementioned tampering assessment process is achieved by two processes of an inner product process and a threshold process.

First, the inner product process will be described. The inner product process is calculated by the expression below (2) by using the characteristic amount data about a flexible region of the original already stored in the ID management part 2380 in association with the file ID, i.e., each piece of one-dimensional vector data (managed in LUT) in the primary scanning direction and the secondary scanning direction, and the characteristic amount data calculated on the basis of the scan data at the current assessment process.

$$A = \Sigma(TMi \times KMi)/(\Sigma TMi)2$$

$$B = \Sigma(TSi \times KSi)/(\Sigma TSi)2 \quad (2)$$

In the expression (2), A and B represent correlation values standardized in the primary scanning direction and the secondary scanning direction, respectively, TM and TS represent vector shapes in the primary scanning direction and the secondary scanning direction for the registered original flexible region, respectively, and KM and KS represent vector shapes in the primary scanning direction and the secondary scanning direction for the flexible region of the paper medium to be assessed, which is calculated by the current assessment process. The numerical subscript "i" indicates the location information. As the result of the calculation is standardized with data at registration, the range of values A and B is 0-1.

The correlation values A and B obtained by the above calculation are compared in the following threshold process and finally, determination is made on whether the paper medium to be assessed and the registered image are the same or not. In the embodiment, it is determined at the threshold process of the expression below (3).

if $((A \geq valA)$ & $(B \geq valB))$ then "the same as the registered image"

else "different from the registered image" (3)

In the expression (3), the threshold values valA and valB are parameters depending on the accuracy of scanner 2070 or the like. In the embodiment, the process is implemented by assuming valA=0.97, valB=0.96.

According to the embodiment, the tampering on image information of the paper medium is assessed only by using image information on a certain region (flexible region 602) without requiring image information on the entire surface of the paper medium. Thus, the calculation load is lighter than that in the process using image information on the entire paper medium.

Second Embodiment

In the Second Embodiment, the case where a template form sheet 601, an original paper medium 601a and a paper medium to be assessed 601b appear across a plurality of pages.

<Registration Process of a Template Form According to the Second Embodiment>

Figure 18:
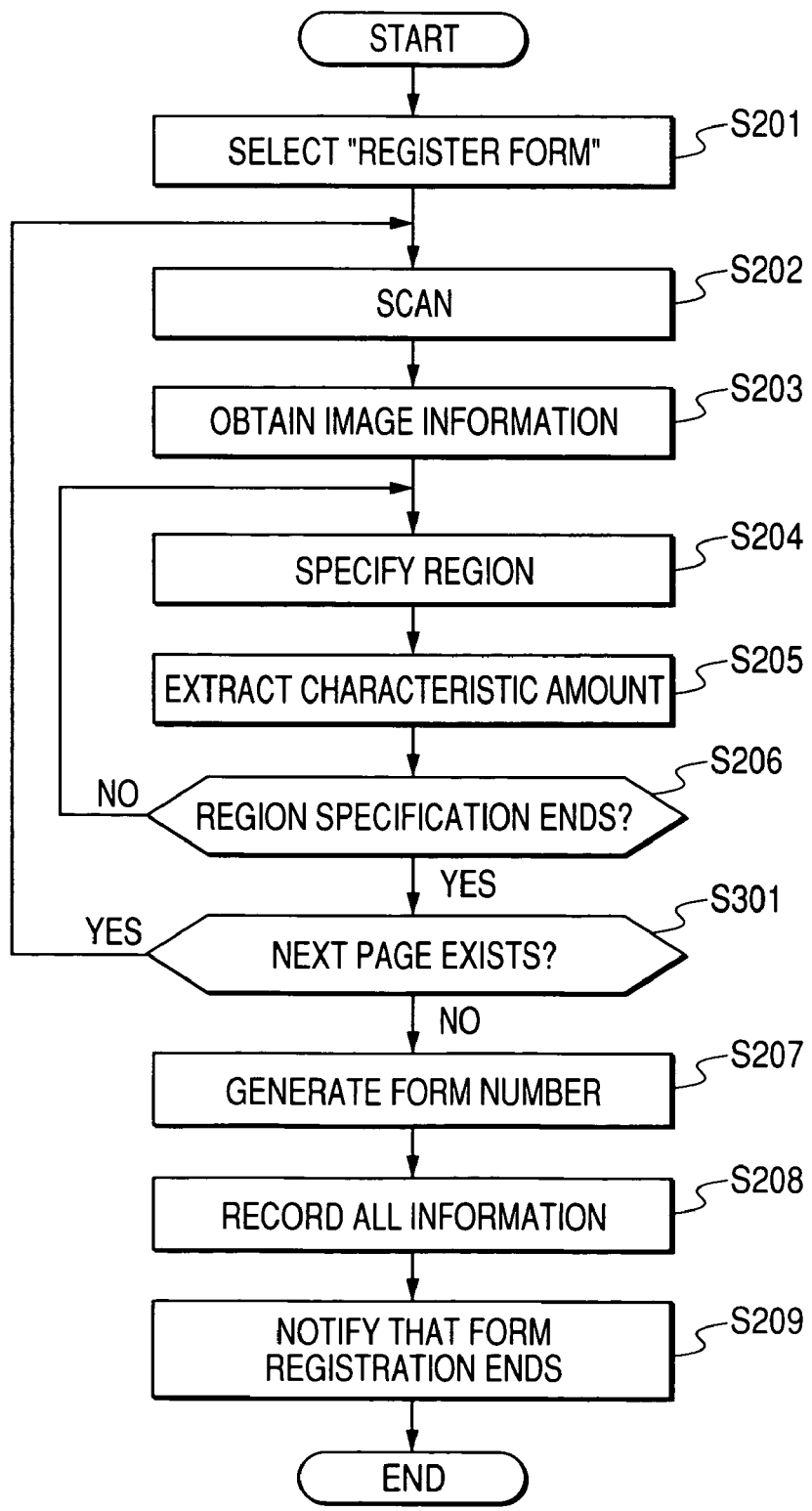
FIG. 18 is a flowchart illustrating a form registration process according to a Second Embodiment.

FIG. 18 is a flowchart illustrating a form registration process according to a Second Embodiment and the same processes as that shown in FIG. 5 are denoted by the same numbers and the description thereof will be omitted.

First, an operator sets a plurality pages of template form sheets on a reading part of the scanner 2270, and has a menu screen displayed on the LCD display part 2013 of the operating part 2212 and selects "Register template form" from the menu (step S201). Then, each page of the template form is scanned and the image information is obtained (step S203), and region specification (step S204) and the extraction of the characteristic amount (step S205) are performed.

If region specification ends in a page (step S206), determination is made on whether the next page exists or not (step S301). If the region specification does not end at step S206, the region specification continues. If it is determined that the next page exits at step S301, the operation returns to step S202 and the procedure is repeated from the scanning. In this manner, a flexible region for each page is specified.

If it is determined that the next page does not exit at step S301, the form number is generated as in the First Embodiment (step S207) and information, which is dealt with from the start, is recorded as form information (step S208), form registration is notified (step S209) and the process ends.

<Original Registration Process According to the Second Embodiment>

FIG. 19 is a flowchart illustrating an original registration process according to the Second Embodiment and the same processes as that shown in FIG. 9 are denoted by the same numbers and the description thereof will be omitted.

First, an operator sets a plurality pages of original paper media 601a on a reading part of the scanner 2270 and selects "Register" at the operating part 2212 as the original registration process of the First Embodiment described with reference to FIG. 9 (step S211), then selects additional information (step S212). Then, the controller unit 2200 scans all pages of the original paper medium 601a with the scanner 2270 and reads the image information (step S311).

Afterwards, from step S214 to step S219, the same processes as those of the original registration process of the First Embodiment are performed. At the characteristic amount calculation process of the flexible region at step S215, the characteristic amount of the flexible region of each page is calculated.

<Tampering Assessment Process of the Second Embodiment>

FIG. 20 is a flowchart illustrating a tampering assessment process according to the Second Embodiment and the same processes as that shown in FIG. 16 are denoted by the same numbers and the description thereof will be omitted.

First, an operator sets a plurality pages of paper media to be assessed 601b on a reading part of the scanner 2270 and selects "Assessment" from the menu screen shown in FIG. 6 at the operating part 2212 as in the tampering assessment process of the First Embodiment described with reference to FIG. 16 (step S231) and reads the image information by scanning all pages of the paper media to be assessed 601b (step S331).

Afterwards, from step S233 to step S239, the same processes as those of the tampering assessment process of the First Embodiment are performed. At the characteristic amount calculation process of the flexible region at step S234, the characteristic amount is calculated from the flexible region of each page and the characteristic amount of the flexible region of respective pages are compared at step S235.

In the abovementioned manner, the present invention is effective in alleviating the calculation load even in the case where a template form sheet 601, an original paper medium 601a and a paper medium to be assessed 601b appear across a plurality of pages.

Other Embodiments

The characteristic calculation process described in the above embodiments (S215) is not limited to the above calculation method and the characteristic amount of the flexible region can be calculated by using the other characteristic amount calculation methods. For example, the characteristic amount can be calculated by using color information in the flexible region or by converting frequencies.

If a plurality of originals in the same template form as that of a paper medium to be assessed are registered, the characteristic amount of the paper medium to be assessed is compared with each of the characteristic amounts of the flexible regions of the plurality of originals in the same template form at step S235. If an original having the same characteristic amount as that of the paper medium to be assessed, "No tampering" is notified and, preferably, information on the original (original ID and image of the original) is displayed at step S237.

Although a template form is registered by using an image obtained by scanning a sheet of paper printed with the template from when the template form for identifying the type of the form is registered in the Embodiments 1 and 2, the present invention is not limited to the embodiments. For example, an image of a template form created by an application may be directly read in and registered as a template form, which specified the flexible region.

Each image used in a form registration process, an original registration process and an assessment process is not limited to be inputted from a scanner and can be inputted from the other device or via a network.

The present invention is not limited to the apparatus of the above embodiments, and may be applied to a system including a plurality of devices or an apparatus including only one device. As a matter of course, the present invention can be achieved by providing a system or an apparatus with a storage medium storing a program code of software for implementing functions of the above embodiments, and causing a computer (or a CPU or an MPU) of the system or the apparatus to read and execute the program code stored in the storage medium.

In such a case, the program code read from the storage medium implements the functions of the embodiments, and the storage medium storing the program code configures the present invention. As a storage medium for providing a program code, a floppy (registered trademark), a disk, a hard disk, an optical disk and a magnetic optical disk, CD-ROM, CD-R, a magnetic tape, a nonvolatile memory card and non-volatile memory, for example, can be used. As a matter of course, the present invention includes not only the case that function of the embodiments are implemented by a computer executing the read out program code, but also the case that a part of or all the actual processes are performed by an OS or the like running on the computer according to instructions of the program code to implement the functions of the embodiment.

Also as a matter of course, the present invention includes the case that a program code read out from a storage medium is written in memory included in an extension board inserted in a computer or an extension unit connected with a computer, and a CPU or the like included in the extension board or the extension unit performs the extended functions according to the following instructions of the program code to perform a part or all of the actual processes and the functions of the embodiments are implemented.

This application claims priority from Japanese Patent Application No. 2004-231247 filed Aug. 6, 2004, which is hereby incorporated by reference herein.

What is claimed is:

1. An image processing system for assessing whether an image to be assessed is an original image, the image processing system comprising:
a storage device storing a plurality of types of template form information; and
at least one controller configured to:
check a form type of the original image against the plurality of types of template form information stored in the storage device and determine a certain region, which is a partial region of the original image, corresponding to the template form information that matches the form information of the original image based on a code specifying the certain region, if the code is embedded in a template form corresponding to the form information of the original image;
extract a characteristic amount of the determined certain region;
store the extracted characteristic amount as a characteristic amount of the original image in the storage device;
identify a form type of the image to be assessed against the plurality of types of template form information stored in the storage device;
determine, in a case where the form type of the image to be assessed is identified from the plurality of types of template form information stored in the storage device, a location of a certain region in the image to be assessed based on the checked form type and extract a characteristic amount of the certain region corresponding to the determined location in the image to be assessed as a characteristic amount of the image to be assessed, wherein in a case where the form type of the image to be assessed is not identified from the plurality of types of template form information stored in the storage device, no characteristic amount of the certain region is extracted, and notifies that the assessment is impossible;
discriminate, in a case where the form type of the image to be assessed is identified from the plurality of types of template form information stored in the storage device, whether the image to be assessed has been tampered by comparing the characteristic amount extracted from the certain region corresponding to the determined location in the image to be assessed with the characteristic amount of the original image stored in said storage device, the form type of the original image being the same as the form type of the image to be assessed; and
notify the result of the discrimination.

2. The image processing system according to claim 1, wherein said at least one controller is further configured to register form information so that said form type and the location of the certain region in the image to be assessed are associated with each other.

3. The image processing system according to claim 2, wherein said at least one controller is further configured to:
specify the location of the certain region associated with said form type based on an instruction from a user;
register the form information including information of the specified location of the certain region;
store the characteristic amount of the certain region corresponding to the location in the original image as the characteristic amount of the original image based on the form information including the information of the specified location of the certain region; and
determine the location of the certain region corresponding to the identified form type based on the registered form information and extract the characteristic amount of the certain region corresponding to the determined location in the image to be assessed.

4. The image processing system according to claim 1, wherein said certain region is a flexible region, to which a user writes.

5. The image processing system according to claim 1, wherein said original image and said image to be assessed include a single page or a plurality of pages.

6. A method of assessing whether an image to be assessed is an original image in an image processing system having a storage device storing a plurality types of template form information, the method comprising:
a region determining step of checking a form type of the original image against the plurality of types of template form information stored in the storage device and determining a certain region, which is a partial region of the original image, corresponding to the template form information that matches the form information of the original image based on a code specifying the certain region, if the code is embedded in a template form corresponding to the form information of the original image;
an original characteristic amount extracting step of extracting a characteristic amount of the certain region determined in said region determining step;
an original characteristic amount storing step of storing the characteristic amount extracted in said original characteristic amount extracting step as a characteristic amount of the original image in the storage device;
a form identifying step of identifying a form type of the image to be assessed against the plurality of types of template form information stored in the storage device using the image processing system;
an assessment characteristic amount extracting step of determining, in a case where the form type of the image to be assessed is identified from the plurality of types of template form information stored in the storage device, a location of a certain region in the image to be assessed based on the form type checked in said form checking step and extracting a characteristic amount of the certain region corresponding to the determined location in the image to be assessed as a characteristic amount of the image to be assessed using the image processing system, wherein in a case where the form type of the image to be assessed is not identified from the plurality of types of template form information stored in the storage device, no characteristic amount of the certain region is extracted, and notifies that the assessment is impossible;
a discriminating step of discriminating, in a case where the form type of the image to be assessed is identified from the plurality of types of template form information stored in the storage device, whether the image to be assessed has been tampered by comparing the characteristic amount extracted from the certain region corresponding to the determined location in the image to be assessed extracted in said assessment characteristic amount extracting step with the characteristic amount of the original image stored in the storage device using the image processing system, the form type of the original image being the same as the form type of the image to be assessed; and
a notification step of notifying the result of discrimination made in said discriminating step using the image processing system.

7. The method according to claim 6, further comprising a form information registering step of registering form information in which said form type and the location of the certain region are associated with each other using the image processing system.

8. The method according to claim 7, wherein:
said form information registering step comprises a certain region specification step of specifying the location of the certain region associated with said form type based on an instruction from a user,
said form information registering step registers the form information including information of the location of the certain region specified in said certain region specification step,
said original characteristic amount storing step stores the characteristic amount of the certain region corresponding to the location in the original image as the characteristic amount of the original image based on the form information including the information of the location of the certain region specified in said certain region specification step, and
said assessment characteristic amount extracting step determines the location of the certain region corresponding to the form type identified in said form identifying step based on the form information registered in said form information registered step and extracts the characteristic amount of the certain region corresponding to the determined location in the image to be assessed.

9. The method according to claim 6, wherein said certain region is a flexible region, to which a user writes.

10. The method according to claim 6, wherein said original image and said image to be assessed include a single page or a plurality of pages.

11. A non-transitory computer-readable medium storing a computer program executable by a computer to determine tampering of an image in an image processing system having a storage device storing a plurality types of template form information, wherein said program comprises program codes for causing the computer to perform:
a region determining step of checking a form type of the original image against a plurality of types of template form information stored in the storage device and determining a certain region, which is a partial region of the original image, corresponding to the template form information that matches the form information of the original image based on a code specifying the certain region, if the code is embedded in a template form corresponding to the form information of the original image;

an original characteristic amount extracting step of extracting a characteristic amount of the certain region determined in said region determining step;

an original characteristic amount storing step of storing the characteristic amount extracted in said original characteristic amount extracting step as a characteristic amount of the original image in the storage device;

a form identifying step of identifying a form type of the image to be assessed against the plurality of types of template form information stored in the storage device;

an assessment characteristic amount extracting step of determining, in a case where the form type of the image to be assessed is identified from the plurality of types of template form information stored in the storage device, a location of a certain region in the image to be assessed based on the form type checked in said form checking step and extracting a characteristic amount of the certain region corresponding to the determined location in the image to be assessed as a characteristic amount of the image to be assessed, wherein in a case where the form type of the image to be assessed is not identified from the plurality of types of template form information stored in the storage device, no characteristic amount of the certain region is extracted, and notifies that the assessment is impossible;

a discriminating step of discriminating, in a case where the form type of the image to be assessed is identified from the plurality of types of template form information stored in the storage device, whether the image to be assessed has been tampered by comparing the characteristic amount extracted from the certain region corresponding to the determined location in the image to be assessed in said assessment characteristic amount extracting step with the characteristic amount of the original image stored in the storage device, the form type of the original image being the same as the form type of the image to be assessed; and a notification step of notifying the result of discriminating made in said discriminating step.

12. The image processing system according to claim 1, wherein the at least one controller is further configured to:

discriminate, in a case where a plurality of the characteristic amounts of original images whose form type is the same as the form type of the image to be assessed are stored in the storage device, whether the image to be assessed has been tampered by comparing the characteristic amount of the image to be assessed with each of the plurality of the characteristic amounts of original images; and notify, in a case where any of the plurality of the characteristic amounts of original images is the same as the characteristic amount of the image to be assessed, that no tampering has been made.

\* \* \* \* \*